United States Patent Office.

SAMUEL R. WHITLOW, OF ROSEFIELD, ILLINOIS.

Letters Patent No. 81,446, dated August 25, 1868.

IMPROVED COUGH-MIXTURE.

*The Schedule referred to in these Letters Patent and making part of the same.*

TO ALL WHOM IT MAY CONCERN:

Be it known that I, SAMUEL R. WHITLOW, of Rosefield, in the county of Peoria, and State of Illinois, have invented a new and useful compound, which I denominate the Golden-Age Cough-Mixture; and I do hereby declare that the following is a full, clear, and exact description of the ingredients forming the compound, the quantities of each, and the manner of compounding, making, and using the same, viz:

The ingredients and their respective quantities:
Bayberry-bark, one ounce.
Solomon-seed root, one ounce.
Sarsaparilla, one ounce.
Seneca snake-root, one ounce.
Red bark, (Peruvian,) one ounce.
Black-cherry bark, one ounce.
Prickly-ash bark, one ounce.
Spikenard-root, two (2) ounces.
Maidenhair-root, one ounce.
Blackberry-root, one ounce.
Oil of wintergreen, one drachm.  (This, viz, the wintergreen, is to be added and mixed after the other ingredients have been boiled.)
Pine-tar, one dessert-spoonful.
Skunk-cabbage, one-half ounce.
Lobelia, one-half ounce.
Ginseng-root, one ounce.
Comfrey-root, one ounce.
Elecampane-root, one ounce.
Hoarhound-leaves, one ounce.
Wafer-ash bark, one ounce.
White sugar, three (3) pounds; and
Clear water, one and one-half gallon.

Mix the foregoing-described ingredients and boil down to three (3) quarts, and after boiling and straining add one pint of Jamaica rum. When cold, it is ready to bottle.

Directions for Use.

For an adult: Dose, one tablespoonful to be taken three (3) times each day, half an hour before meals and on retiring to bed at night.

For a child six months old: Dose, fifteen (15) drops, three times each day, the last on going to bed, or oftener, if the case be severe.

For a child one year old: Dose, two-thirds ($\frac{2}{3}$) of a teaspoonful three times each day, and older children in proportion.

No water to be taken in any case for twenty (20) minutes after the mixture is taken.

Claim.

Having thus described my invention, what I claim as new, and desire to secure by Letters Patent, is—

The compound cough-mixture, prepared and compounded, and to be used substantially as described.

SAMUEL R. WHITLOW.

Witnesses:
EDMUND THURLOW,
J. M. COCHRAN.